(12) United States Patent
Fan (10) Patent No.: US 12,069,192 B2
(45) Date of Patent: Aug. 20, 2024

(54) DUSTPROOF ASSEMBLY AND FOLDABLE ELECTRONIC DEVICE

(71) Applicant: Wuhan China Star Optoelectronics Semiconductor Display Technology Co., Ltd., Wuhan (CN)

(72) Inventor: Yu Fan, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/440,287

(22) PCT Filed: Jun. 9, 2021

(86) PCT No.: PCT/CN2021/099036
§ 371 (c)(1),
(2) Date: Sep. 17, 2021

(87) PCT Pub. No.: WO2022/252262
PCT Pub. Date: Dec. 8, 2022

(65) Prior Publication Data
US 2024/0129385 A1    Apr. 18, 2024

(30) Foreign Application Priority Data

May 31, 2021 (CN) .......................... 202110607410.2

(51) Int. Cl.
*H04M 1/02* (2006.01)
(52) U.S. Cl.
CPC ....... *H04M 1/0214* (2013.01); *H04M 1/0268* (2013.01)

(58) Field of Classification Search
CPC ............. H04M 1/0214; H04M 1/0268; H04M 1/0216; H04M 1/064; H04M 1/0222;
(Continued)

(56) References Cited

U.S. PATENT DOCUMENTS

2016/0147263 A1    5/2016  Choi et al.
2019/0307004 A1*  10/2019  Fan ...................... H05K 5/0017
(Continued)

FOREIGN PATENT DOCUMENTS

CN    109058284 A    12/2018
CN    110035151 A    7/2019
(Continued)

*Primary Examiner* — Angelica Perez
(74) *Attorney, Agent, or Firm* — Nathan & Associates; Menachem Nathan (57) ABSTRACT

A dustproof assembly and a foldable electronic device are provided. The dustproof assembly includes a bracket and an elastic member connected with the bracket. The elastic member has a first and a second state. When the elastic member is in the first state, the elastic member is unfolded. When the elastic member is in the second state, the elastic element is relatively folded around a first convex portion. The dustproof assembly also includes a dustproof membrane. One end of the dustproof membrane is fixed on a second convex portion, and another end of the dustproof membrane is fixed on the elastic member. The elastic member drives the dustproof membrane to deform and switch between the first state and the second state.

18 Claims, 5 Drawing Sheets

(58) Field of Classification Search
CPC .. H04M 1/0227; H04M 1/022; H04M 1/0218; H04M 1/0233; H04M 1/026; G06F 1/1681; G04B 37/0016; G04B 37/0427; H01H 3/162; H01H 2003/466; H01R 13/501
See application file for complete search history.

(56) References Cited

U.S. PATENT DOCUMENTS

| | | | |
|---|---|---|---|
| 2020/0037458 A1* | 1/2020 | Si | H04M 1/0268 |
| 2021/0116975 A1* | 4/2021 | Moon | G06F 1/1656 |
| 2022/0137667 A1* | 5/2022 | Kim | G06F 1/165 |
| | | | 361/679.21 |
| 2023/0359247 A1* | 11/2023 | Du | G06F 1/1652 |
| 2023/0393618 A1* | 12/2023 | Park | H04M 1/0214 |

FOREIGN PATENT DOCUMENTS

| | | | |
|---|---|---|---|
| CN | 110719346 A | | 1/2020 |
| CN | 110971728 A | | 4/2020 |
| CN | 111477115 A | | 7/2020 |
| CN | 111698355 A | | 9/2020 |
| CN | 211453344 U | * | 9/2020 |
| CN | 211453344 U | | 9/2020 |
| CN | 112015235 A | | 12/2020 |
| CN | 112150921 A | | 12/2020 |

\* cited by examiner

DUSTPROOF ASSEMBLY AND FOLDABLE ELECTRONIC DEVICE

FIELD OF INVENTION

The present invention relates to a technical field of foldable screens, in particular to a dustproof assembly and a foldable electronic device.

BACKGROUND OF INVENTION

With user's demand for light, thin, and miniaturized mobile phones, foldable mobile phones are coming. Currently, a foldable mobile phone generally realizes its folding through a hinge, and a design of a hinge structure of the foldable mobile phone is more complicated and the hinge structure is exposed to air. During a whole process of the foldable mobile phone from fully unfolding to folding, the hinge structure of the foldable mobile phone cannot effectively prevent foreign matter and dust from entering the hinge structure. The foreign matter and the dust will affect the user's use and a rotation function of the folding mobile phone.

Technical Problem

A dustproof assembly and a foldable electronic device provided by the present invention can be applied to a variety of usage scenarios and can effectively prevent foreign matter and dust from entering the dustproof assembly of a hinge structure and the foldable electronic device.

SUMMARY OF INVENTION

In order to solve the above problems, the technical solution provided by the present invention is as follows:

The present invention provides a dustproof assembly, including: a bracket including a first convex portion and a second convex portion, wherein the first convex portion and the second convex portion are respectively formed on the same surface of the bracket; an elastic member connected to the bracket through the first convex portion, wherein the elastic member has a first state and a second state, when the elastic member is in the first state, the elastic member is unfolded, and when the elastic member is in the second state, two ends of the elastic member are relatively folded around the first protrusion; and a dustproof membrane, wherein one end of the dustproof membrane is fixed on the second convex portion, and another end of the dustproof membrane is fixed on the elastic member; wherein, the elastic member is configured to drive the dustproof membrane to deform between the first state and the second state.

In an optional embodiment of the present invention, wherein when the elastic member is in the first state, the dustproof membrane is folded, and when the elastic member is in the second state, the dustproof membrane is unfolded under a drive of the elastic member.

In an optional embodiment of the present invention, the elastic member includes a middle portion, a first end, and a second end, the middle portion is located between the first end and the second end, the first convex portion is connected to the middle portion, and the first end and the second end protrude from the bracket.

In an optional embodiment of the present invention, a first groove is formed on the middle portion, and the first convex portion is received and fixed in the first groove.

In an optional embodiment of the present invention, a second groove is further formed on the middle portion. The dustproof membrane includes a dustproof portion and a fixing portion perpendicularly connected to the dustproof portion. One end of the dustproof portion is fixed on the second convex portion, and the fixing portion is received and fixed in the second groove. The dustproof portion is configured to deform under the drive of the elastic member to switch between the first state and the second state.

In an optional embodiment of the present invention, the dustproof portion is foldable.

In an optional embodiment of the present invention, a thickness of the middle portion is greater than a thickness of the first end and a thickness of the second end.

The present invention further provides a foldable electronic device, including a main body and a hinge structure, wherein the main body is configured to be foldable relative to the hinge structure, and the foldable electronic device further includes the dustproof assembly as described above, the dustproof assembly is disposed in the main body and covers the hinge structure.

In an optional embodiment of the present invention, the foldable electronic device further includes a first front frame, a second front frame, and a flexible screen. Wherein, the flexible screen is formed on the hinge structure, and the hinge structure can drive the flexible screen to fold relatively. Two ends of the elastic member protruding from the bracket are respectively arranged between the first front frame and the flexible screen and between the second front frame and the flexible screen.

In an optional embodiment of the present invention, the two ends of the elastic member protruding from the bracket are respectively bonded to the first front frame, the second front frame and the flexible screen through adhesive.

In an optional embodiment of the present invention, the foldable electronic device further includes a hinge cover, the hinge cover is fixed on the hinge structure. An end of the bracket of the dustproof assembly away from the elastic member is fixedly connected to the hinge cover.

In an optional embodiment of the present invention, the hinge structure further includes a first movable part, a second movable part, and a supporting part. The first movable part and the second movable part are foldably connected to the supporting part. The supporting part is fixedly connected to the hinge cover, and the first movable part and the second movable part can be relatively folded around the supporting part.

In an optional embodiment of the present invention, the foldable electronic device further includes a first middle frame and a second middle frame. The first movable part is fixedly connected to the first middle frame, and the second middle frame is fixedly connected to the second middle frame. A first receiving cavity is formed on the first middle frame, and a second receiving cavity is formed on the second middle frame, and the hinge cover is received in the first receiving cavity and the second receiving cavity. The first movable part is drive the first middle frame, the flexible screen, and the front frame to fold, and the second movable part is drive the second middle frame, the flexible screen, and the second front frame to fold

Beneficial Effect

The beneficial effects of this application are:

(1) The bracket of the dustproof assembly provided by the present invention serves as a skeleton of an entire dustproof assembly, and its hard structure plays a role in maintaining the entire dustproof assembly. The elastic member is elastic and fixed on the bracket, and the two ends of the elastic member are sealed and connected with the flexible screen so that it can deform with the folding of the flexible screen. One end of a dustproof membrane is fixed on the bracket, and the other end of the dustproof membrane is fixed on the elastic member. In this way, the dustproof membrane connects the bracket and the elastic member together, so that the entire dustproof assembly can be deformed correspondingly with the folding of the flexible screen. In addition, during the whole process, no separation occurs between the bracket, the elastic member, and the dustproof membrane. Therefore, the dustproof assembly can seal the hinge structure. Therefore, it is ensured that the dustproof assembly can play a dustproof effect in the whole process from fully unfolding to folding, and meets the protection needs of users in various usage scenarios.

(2) Two ends of the elastic member protruding from the bracket are respectively bonded to the first front frame, the second front frame and the flexible screen, which can prevent the elastic member from detaching from the flexible screen during the folding process.

(3) The deformation of the dustproof membrane can be adapted to the deformation of the flexible screen during the whole process of folding to unfolding, which will not cause large stress to affect the service life of the flexible screen, and the dustproof membrane can be hidden inside the bracket without being exposed. It can effectively prevent users from damaging the dustproof membrane structure during use.

DESCRIPTION OF DRAWINGS

In order to more clearly describe the technical solutions in the embodiments of the present invention, the following will briefly introduce the drawings that need to be used in the description of the embodiments. Obviously, the drawings in the following description are only some embodiments of the present invention. For those skilled in the art, other drawings can be obtained from these drawings without doing creative work.

DETAILED DESCRIPTION OF PREFERRED EMBODIMENTS

The technical solutions in the embodiments of the present invention will be clearly and completely described below with reference to the drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

In the description of the present application, it should be understood that the orientation or positional relationship indicated by the terms "upper", "lower", etc. are based on the orientation or positional relationship shown in the drawings. It is only for the convenience of describing the application and simplifying the description, rather than indicating or implying that the device or element referred to must have a specific orientation, be constructed and operated in a specific orientation, and therefore cannot be understood as a limitation of the application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "plurality" means two or more than two, unless otherwise specifically defined.

The present application may repeat reference numerals and/or reference letters in different examples, and this repetition is for the purpose of simplification and clarity, and does not indicate the relationship between the various embodiments and/or arrangements discussed.

The present invention addresses a technical problem that current foldable electronic devices cannot effectively prevent foreign matter and dust from entering hinge structures. A dustproof assembly that can deform correspondingly with folding of a flexible screen is additionally provided at a position corresponding to the hinge structure. During a whole process, there is no separation between a bracket, an elastic member, and a dustproof membrane of the dustproof assembly to ensure that it can play a dust-proof role in the whole process from fully unfolding to folding, and meet protection needs of users in a variety of usage scenarios.

The dustproof assembly and a foldable electronic device of the present invention will be described in detail below with reference to specific embodiments.

Please refer to FIG. 1 to FIG. 4. A preferred embodiment of the present invention provides a foldable electronic device 100. The foldable electronic device 100 can be a foldable electronic device such as a mobile phone or a tablet computer. The foldable electronic device 100 includes a main body 110, a hinge structure 120, a hinge cover 130, and a dustproof assembly 140. The hinge structure 120 is fixed on the hinge cover 130. The dustproof assembly 140 covers the hinge structure 120 and is fixed on the hinge cover 130. The hinge structure 120, the hinge cover 130, and the dustproof assembly 140 are all disposed in the main body 110.

Figure 1:
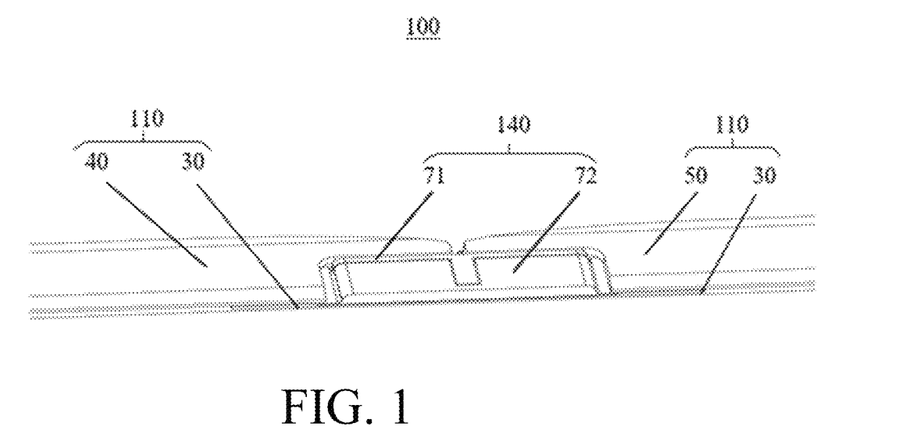
FIG. 1 is a partial schematic diagram of a foldable electronic device provided by the present invention.
Figure 2:
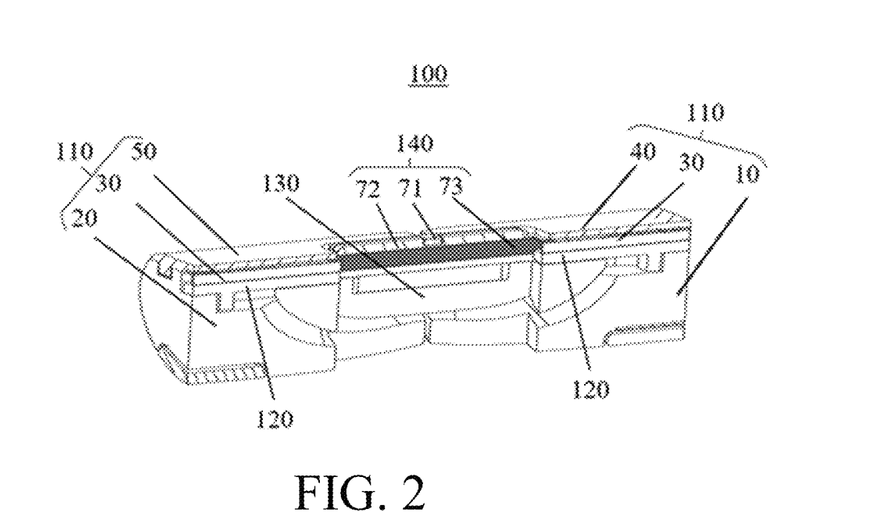
FIG. 2 is a cross-sectional view of an assembled state of the foldable electronic device shown in FIG. 1.
Figure 3:
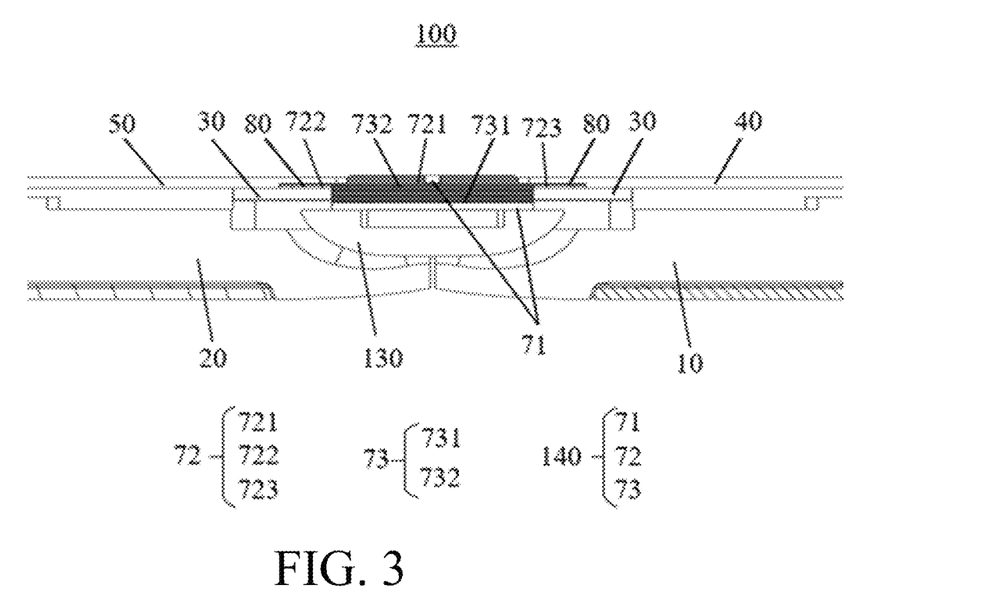
FIG. 3 is a front cross-sectional view of the foldable electronic device shown in FIG. 1.

Please refer to FIG. 2 to FIG. 4 again. The main body 110 includes a first middle frame 10, a second middle frame 20, a flexible screen 30, a first front frame 40, and a second front frame 50. Wherein, the first middle frame 10 and the second middle frame 20 are connected together by the hinge structure 120.

Figure 4:
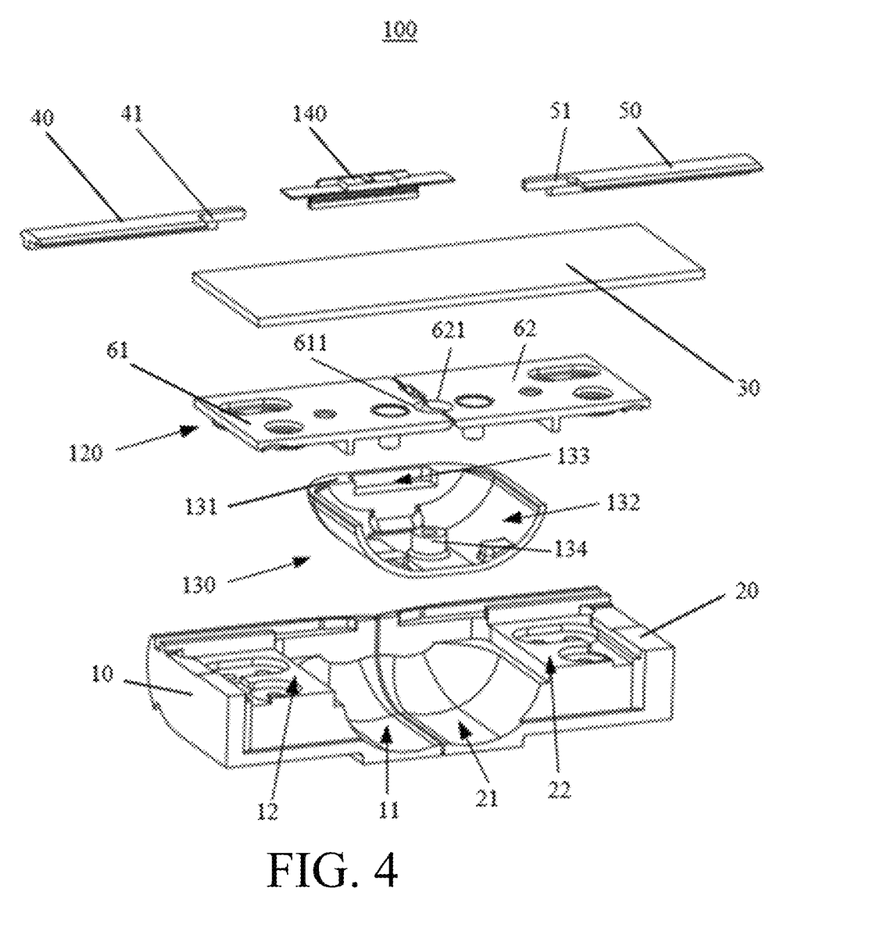
FIG. 4 is an exploded view of the foldable electronic device shown in FIG. 1.

Specifically, the first middle frame 10 includes a first receiving cavity 11 and a third receiving cavity 12. A bottom of the first receiving cavity 11 is lower than a bottom of the third receiving cavity 12. In this embodiment, the first receiving cavity 11 has an arc shape. Preferably, the first receiving cavity 11 has a ¼ circular shape.

Specifically, the second middle frame 20 includes a second receiving cavity 21 and a fourth receiving cavity 22. A bottom of the second receiving cavity 21 is lower than a bottom of the fourth receiving cavity 22. In this embodiment, the second receiving cavity 21 has an arc shape. Preferably, the second receiving cavity 21 has a ¼ circular shape. The second receiving cavity 21 is opposite to the first receiving cavity 11. The second receiving cavity 21 and the first receiving cavity 11 are defined between the third receiving cavity 12 and the fourth receiving cavity 22.

Specifically, the flexible screen 30 has a first state and a second state. When the flexible screen 30 is unfolded, the flexible screen 30 is in the first state, and when the flexible screen 30 is folded, the flexible screen 30 is in the second state.

Specifically, the first front frame 40 is connected to the first middle frame 10, and the second front frame 50 is connected to the second middle frame 20. A part of the flexible screen 30 is formed between the first front frame 40 and the first middle frame 10, and another part of the flexible screen 30 is formed between the second front frame 50 and the second middle frame 20.

Wherein, the first front frame 40 is configured a first notch 41, and the second front frame 50 is configured a second notch 51. The first notch 41 is opposite to the second notch 51. The first notch 41 and the second notch 51 are used for receiving a middle portion 721 of an elastic member 72 described below.

Please refer to FIG. 4. The hinge structure 120 includes a first movable part 61, a second movable part 62, and a supporting part (not shown). The first movable part 61 and the second movable part 62 are connected to the supporting part. The first movable part 61 and the second movable part 62 can be relatively folded with the supporting part as a rotation axis.

Specifically, a first receiving hole 611 is defined on the first movable member 61, and a second receiving hole 621 is defined on the second movable part 62. The first receiving hole 611 is opposite to the second receiving hole 621. One end of the supporting part is fixed in a complete receiving hole formed by the first receiving hole 611 and the second receiving hole 621.

Specifically, the first movable part 61 is fixed in the third receiving cavity 12 of the first middle frame 10, and the second movable part 62 is fixed in the fourth receiving cavity 22 of the second middle frame 20. A projection of the first receiving hole 611 on the first middle frame 10 falls in the first receiving cavity 11, and a projection of the second receiving hole 621 on the second middle frame 20 falls in the second receiving cavity 21.

Please refer to FIG. 2 to FIG. 4 again. The hinge cover 130 is received in the first receiving cavity 11 and the second receiving cavity 21. The hinge structure 120 is disposed on the hinge cover 130. The hinge cover 130 includes a cover body 131, and the cover body 131 is arc-shaped. A fifth receiving cavity 132 and a groove 133 are respectively recessed from a surface of the cover body 131 facing the hinge structure 120 toward an inside of the cover body 131. The fifth receiving cavity 132 is in communication with the groove 133. A size of the fifth receiving cavity 132 is larger than a size of the groove 133, and a bottom of the fifth receiving cavity 132 is lower than a bottom of the groove 133. A bump 134 is formed at the bottom of the fifth receiving cavity 132, and the supporting part is received in the fifth receiving cavity 132 and fixed on the bump 134. A projection of a junction of the first movable part 61 and the second movable part 62 on the hinge cover 130 falls in the fifth receiving cavity 132 and the groove 133 so that when the first movable part 61 and the second movable part 62 are folded with the supporting part as a rotation axis, the first movable part 61 and the second movable part 62 are avoided.

Figure 5:
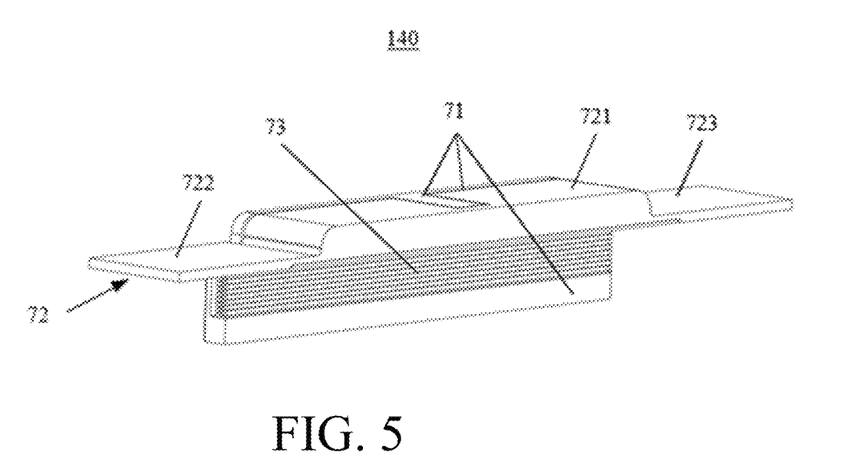
FIG. 5 is an enlarged view of a dustproof assembly of the foldable electronic device shown in FIG. 4 (in a first state).
Figure 6:
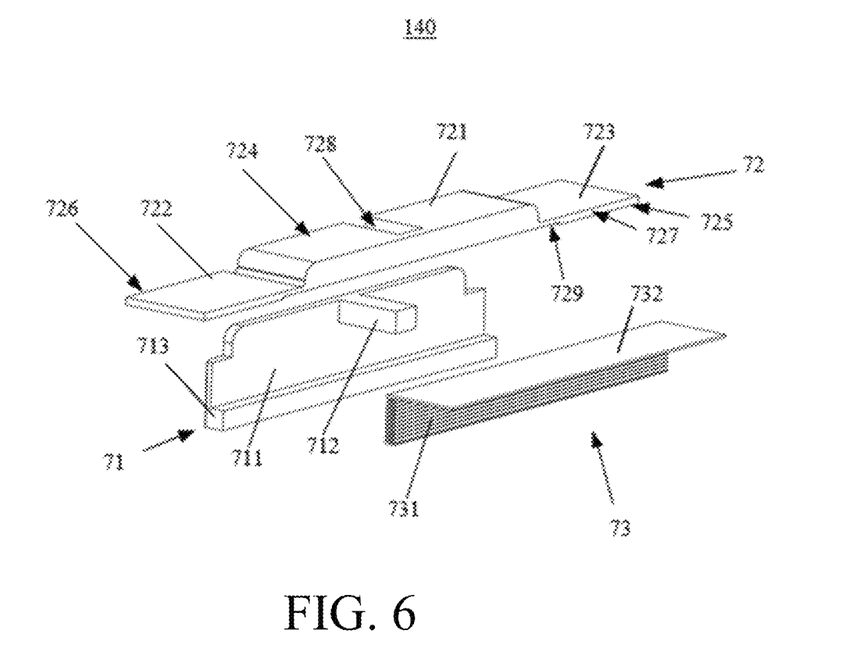
FIG. 6 is an exploded view of the dustproof assembly shown in FIG. 5.
Figure 7:
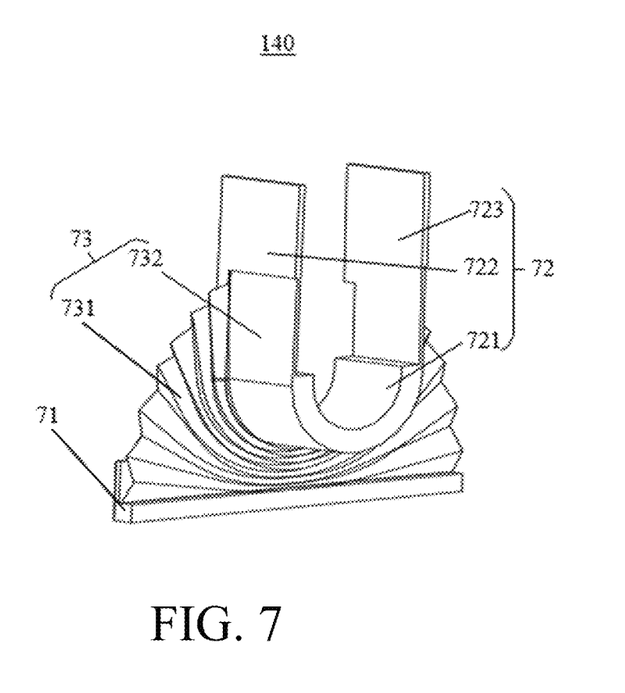
FIG. 7 is a schematic diagram of the dustproof assembly shown in FIG. 5 when it is in a second state.

Please refer to FIG. 5 to FIG. 7. The dustproof assembly 140 includes a bracket 71, an elastic member 72, and a dustproof membrane 73.

Specifically, the bracket 71 is substantially in a shape of a thin plate. The bracket 71 includes a bracket body 711 and a first convex portion 712 and a second convex portion 713 fixed on the bracket body 711. The first convex portion 712 and the second convex portion 713 are respectively located on a same surface of the bracket body 711. The first convex portion 712 and the second convex portion 713 are respectively located at two ends of the bracket body 711. Extending directions of the first convex portion 712 and the second convex portion 713 are perpendicular to each other. Wherein, the bracket 71 is a skeleton of the dustproof assembly 140, and its hard structure plays a role in holding the dustproof assembly 140.

In this embodiment, the bracket body 711 is substantially in a shape of a rectangular thin plate. Certainly, a shape of the bracket body 711 is not limited to a rectangle, and the bracket body 711 can be adjusted and determined according to actual conditions.

In this embodiment, a material of the bracket 71 is plastic.

Please refer to FIG. 2, FIG. 3, and FIG. 5. One end of the elastic member 72 protruding from the bracket 71 is attached to the first front frame 40 and the flexible screen 30, and another end of the elastic member 72 protruding from the bracket 71 is attached to the second front frame 50 and the flexible screen 30. The elastic member 72 can switch between the first state and the second state along with the flexible screen 30. When the flexible screen 30 is in the first state, the elastic member 72 is unfolded. When the flexible screen 30 is in the second state, the elastic member 72 is relatively folded with the first convex portion 712 as a rotation axis.

In this embodiment, the two ends of the elastic member 72 protruding from the bracket 71 are respectively bonded to the first front frame 40, the second front frame 50, and the flexible screen 30 through a back adhesive 80 to prevent the flexible screen 30 from being separated from the elastic member 72 during a folding process.

Wherein, the elastic member 72 mainly plays a role of sealing with the flexible screen 30 and the first middle frame 10 and the second middle frame 20.

Wherein, hardness of the elastic member 72 is less than hardness of the bracket 71 and has a certain supporting effect.

In this embodiment, a material of the elastic member 72 is silica gel. Certainly, the material of the elastic member 72 is not limited to silica gel.

Specifically, please refer to FIG. 6. The elastic member 72 includes a middle portion 721, a first end portion 722, and a second end portion 723, and the middle portion 721 is located between the first end portion 722 and the second end portion 723. The first convex portion 712 is connected to the middle portion 721. The first end portion 722 and the second end portion 723 protrude from the bracket 71.

Wherein, the elastic member 72 includes a first surface 724, a second surface 725 opposite to the first surface 724, and a first side surface 726 perpendicularly connected to the first surface 724 and the second surface 725, and a second side surface 727 opposite to the first side surface 726. The first side surface 726 faces the bracket body 711, and the second surface 725 faces the second convex portion 713.

In this embodiment, a first groove 728 is defined on the middle portion 721, and the first convex portion 712 is received and fixed in the first groove 728. Specifically, the first groove 728 is recessed from the first side surface 726 and the first surface 724 toward an inside of the elastic member 72. In other words, in this embodiment, the first groove 728 penetrates the first surface 724 and the first side surface 726.

In this embodiment, a second groove 729 is also defined on the elastic member 72. The second groove 729 is recessed from the second surface 725 toward the inside of the elastic member 72.

In this embodiment, the second groove 729 is further recessed from the second side surface 727 toward the inside of the elastic member 72. In other words, in this embodiment, the second groove 729 penetrates the second surface 725 and the second side surface 727. Certainly, in other embodiments, the second groove 729 may not penetrate the second side surface 727.

In this embodiment, the second groove 729 is located on the middle portion 721 and extends from the middle portion 721 to the first end portion 722 and the second end portion 723. In other words, the second groove 729 spans a part of the first end portion 722, the entire middle portion, and a part of the second end portion 723. Certainly, in other embodiments, a position of the second groove 729 may be determined according to actual conditions.

The first groove 728 and the second groove 729 are both defined on the middle portion 721. In order to prevent the middle portion 721 from breaking, a thickness of the middle portion 721 may be greater than a thickness of the first end portion 722 and a thickness of the second end portion 723.

Please refer to FIG. 5, one end of the dustproof membrane 73 is fixed on the second convex portion 713, and another end is fixed on the second surface 725 of the elastic member 72.

Specifically, please refer to FIG. 6. The dustproof membrane 73 includes a dustproof portion 731 and a fixing portion 732 perpendicularly connected to the dustproof portion 731. One end of the dustproof portion 731 is fixed on the second convex part 713. The fixing portion 732 is received and fixed in the second groove 729 of the elastic member 72 to prevent the dustproof membrane 73 from being separated from the bracket 71 and the elastic member 72, thereby forming a seal to prevent dust and the like from entering the hinge structure 120.

A deformation of the dustproof membrane 731 can be adapted to a deformation of the flexible screen during a whole process of folding to unfolding, which will not cause large stress to affect service life of the flexible screen, and the dustproof membrane can be hidden inside the bracket without being exposed. It can effectively prevent users from damaging a dustproof membrane structure during use. Wherein, an adaptive deformation refers to a deformation that occurs through its own change and can be restored to its original state.

In this embodiment, the dustproof portion 731 is a foldable dustproof portion, and the foldable dustproof portion is formed by an unfolded dustproof membrane layer that is folded in a limited number of times.

Specifically, please refer to FIG. 7, when the flexible screen 30 is in the first state, the dustproof portion 731 is folded, and when the flexible screen 30 is in the second state, the dustproof portion 731 is unfolded under drive of the elastic member 72.

Wherein, the number of times of folding of the dustproof portion 731 needs to be determined according to actual conditions.

Preferably, the dustproof portion 731 has elasticity, which can prevent the dustproof portion 731 from cracking.

Please refer to FIG. 2 and FIG. 3 again, which show that when the foldable electronic device 100 is in an assembled state. The first front frame 40 overlaps the first middle frame 10, and the second front frame 50 overlaps the second middle frame 20. The hinge cover 130 is received in the first receiving cavity 11 of the first middle frame 10 and the second receiving cavity 21 of the second middle frame 20. The first movable part 61 of the hinge structure 120 is fixed in the third receiving cavity 12 of the first middle frame 10, and the second movable part 62 of the hinge structure 120 is fixed in the fourth receiving cavity 22 of the second middle frame 20. The supporting part of the hinge structure 120 is fixedly connected to the bump 134 of the hinge cover 130. The flexible screen 30 is formed between the hinge structure 120 (the first movable part 61 and the second movable part 62) and the first front frame 40 and the second front frame 50. The end of the bracket 71 of the dustproof assembly 140 away from the first convex portion 712 is fixedly connected to the cover body 131 of the hinge cover 130. The first end portion 722 of the elastic member 72 of the dustproof assembly 140 is attached between the flexible screen 30 and the first front frame 40 through the back adhesive 80. The second end portion 723 of the elastic member 72 of the dustproof assembly 140 is attached between the flexible screen 30 and the second front frame 50 through the back adhesive 80. The middle portion 721 of the elastic member 72 of the dustproof assembly 140 is received in the first notch 41 of the first front frame 40 and the second notch 51 of the second front frame 50. In this situation, the dustproof portion 731 of the dustproof membrane 73 faces the hinge structure 120. The flexible screen 30 is located under the elastic member 72, and a part of the flexible screen 30 is blocked by the dustproof portion 731 of the dustproof membrane 73.

Beneficial effects of the present invention are:

(1) The bracket of the dustproof assembly provided by the present invention serves as a skeleton of an entire dustproof assembly, and its hard structure plays a role in maintaining the entire dustproof assembly. The elastic member is fixed on the bracket, and two ends of the elastic member are sealed and connected with the flexible screen so that it can deform with folding of the flexible screen. One end of the dustproof membrane is fixed on the bracket, and another end of the dustproof membrane is fixed on the elastic member. In this way, the dustproof membrane connects the bracket and the elastic member together, so that the dustproof membrane can adaptively deform with folding or unfolding of the flexible screen. In addition, during the whole process, no separation occurs between the bracket, the elastic member, and the dustproof membrane. Therefore, the dustproof assembly can seal the hinge structure, and therefore, it is ensured that the dustproof assembly can play a dust-proof function during the whole process from fully unfolding to folding, and meets the protection needs of users in various usage scenarios.

(2) The two ends of the elastic member protruding from the bracket are respectively bonded to the first front frame, the second front frame, and the flexible screen, which can prevent the elastic member from detaching from the flexible screen during the folding process.

(3) The deformation of the dustproof membrane can be adapted to the deformation of the flexible screen during the whole process of folding to unfolding, which will not cause large stress to affect the service life of the flexible screen, and the dustproof membrane can be hidden inside the bracket without being exposed. It can effectively prevent the users from damaging the dustproof membrane structure during the use.

As mentioned above, although the present invention has been disclosed above in preferred embodiments, the above-mentioned preferred embodiments are not intended to limit the present invention. Those of ordinary skill in the art can make various changes and modifications without departing from the spirit and scope of the present invention. Therefore, the protection scope of the present invention is subject to the scope defined by the claims.

What is claimed is:

1. A dustproof assembly for an electronic device, comprising:
    a bracket comprising a first convex portion and a second convex portion, wherein the first convex portion and the second convex portion are respectively formed on a same surface of the bracket;
    an elastic member connected to the bracket through the first convex portion, wherein the elastic member has a first state and a second state, when the elastic member is in the first state, the elastic member is unfolded, and when the elastic member is in the second state, two ends of the elastic member are relatively folded around the first convex portion; and
    a dustproof membrane, wherein one end of the dustproof membrane is fixed on the second convex portion, and another end of the dustproof membrane is fixed on the elastic member; wherein, the elastic member is configured to drive the dustproof membrane to deform and switch between the first state and the second state;
    wherein a first groove is defined on a middle portion of the elastic member, and the first convex portion is received and fixed in the first groove.

2. The dustproof assembly of claim 1, wherein when the elastic member is in the first state, the dustproof membrane is folded, and when the elastic member is in the second state, the dustproof membrane is unfolded under a drive of the elastic member.

3. The dustproof assembly of claim 2, wherein the elastic member further comprises a first end portion, and a second end portion, the middle portion is located between the first end portion and the second end portion, the first convex portion is connected to the middle portion, and the first end portion and the second end portion protrude from the bracket.

4. The dustproof assembly of claim 3, wherein a second groove is further defined on the middle portion; the dustproof membrane comprises a dustproof portion and a fixing portion perpendicularly connected to the dustproof portion, one end of the dustproof portion is fixed on the second convex portion, the fixing portion is received and fixed in the second groove, and the dustproof portion is configured to deform under the drive of the elastic member to switch between the first state and the second state.

5. The dustproof assembly of claim 4, wherein the dustproof portion is foldable.

6. The dustproof assembly of claim 3, wherein a thickness of the middle portion is greater than a thickness of the first end portion and a thickness of the second end portion.

7. A foldable electronic device, comprising a main body and a hinge structure, wherein the main body is configured to be foldable relative to the hinge structure, and the foldable electronic device further comprises:
    a dustproof assembly disposed in the main body and covering the hinge structure, wherein the dustproof assembly comprises:
    a bracket comprising a first convex portion and a second convex portion, wherein the first convex portion and the second convex portion are respectively formed on a same surface of the bracket;
    an elastic member connected to the bracket through the first convex portion, wherein the elastic member has a first state and a second state, when the elastic member is in the first state, the elastic member is unfolded, and when the elastic member is in the second state, two ends of the elastic member are relatively folded around the first convex portion; and
    a dustproof membrane, wherein one end of the dustproof membrane is fixed on the second convex portion, and another end of the dustproof membrane is fixed on the elastic member; wherein the elastic member is configured to drive the dustproof membrane to deform and switch between the first state and the second state;
    wherein a first groove is defined on a middle portion of the elastic member, and the first convex portion is received and fixed in the first groove.

8. The foldable electronic device of claim 7, wherein the main body comprises a first front frame, a second front frame, and a flexible screen; wherein the flexible screen is disposed on the hinge structure, and the hinge structure is configured to drive the flexible screen to fold relatively; and wherein one end of the elastic member protruding from the bracket is attached to the first front frame and the flexible screen, and another end of the elastic member protruding from the bracket is attached to the second front frame and the flexible screen.

9. The foldable electronic device of claim 8, wherein the two ends of the elastic member protruding from the bracket are respectively bonded to the first front frame, the second front frame, and the flexible screen by a back adhesive.

10. The foldable electronic device of claim 8, wherein the main body further comprises a hinge cover fixed on the hinge structure, and an end of the bracket of the dustproof assembly away from the elastic member is fixedly connected to the hinge cover.

11. The foldable electronic device of claim 10, wherein the hinge structure further comprises a first movable part, a second movable part, and a supporting part, the first movable part and the second movable part are connected to the supporting part, the first movable part and the second movable part are configured to be relatively foldable with the supporting part as a rotation axis; the supporting part is fixedly connected to the hinge cover, and the first movable part and the second movable part are configured to be relatively foldable around the supporting part.

12. The foldable electronic device of claim 11, wherein the main body further comprises a first middle frame and a second middle frame; the first movable part is fixedly connected to the first middle frame, and the second movable part is fixedly connected to the second middle frame, a first receiving cavity is defined on the first middle frame, and a second receiving cavity is defined on the second middle frame, and the hinge cover is received in the first receiving cavity and the second receiving cavity; the first movable part is configured to drive the first middle frame, the flexible screen, and the front frame to fold, and the second movable part is configured to drive the second middle frame, the flexible screen, and the second front frame to fold.

13. The foldable electronic device of claim 7, wherein when the elastic member is in the first state, the dustproof membrane is folded, and when the elastic member is in the second state, the dustproof membrane is unfolded under a drive of the elastic member.

14. The foldable electronic device of claim 13, wherein the elastic member further comprises a first end portion, and a second end portion, the middle portion is located between the first end portion and the second end portion, the first convex portion is connected to the middle portion, and the first end portion and the second end portion protrude from the bracket.

15. The foldable electronic device of claim 14, wherein a second groove is further defined on the middle portion; the dustproof membrane comprises a dustproof portion and a fixing portion perpendicularly connected to the dustproof portion, one end of the dustproof portion is fixed on the second convex portion, and the fixing portion is received and fixed in the second groove, the dustproof portion is configured to deform under the drive of the elastic member to switch between the first state and the second state.

16. The foldable electronic device of claim 15, wherein the dustproof portion is foldable.

17. The foldable electronic device of claim 14, wherein a thickness of the middle portion is greater than a thickness of the first end portion and a thickness of the second end portion.

18. The foldable electronic device of claim 7, wherein hardness of the elastic member is less than hardness of the bracket, and a material of the elastic member is silica gel.

* * * * *